United States Patent Office 3,350,357
Patented Oct. 31, 1967

3,350,357
PROCESS FOR PREPARING KETOKETENE
POLYMERS
Giulio Natta, Giorgio Mazzanti, and Gianfranco Pregaglia, Milan, Italy, assignors to Montecatini Edison S.p.A., Milan, Italy
No Drawing. Filed Mar. 25, 1964, Ser. No. 354,788
Claims priority, application Italy, Dec. 24, 1959, 21,439/59; July 1, 1960, 11,670/60; Mar. 26, 1963, 6,207/63
16 Claims. (Cl. 260—63)

This application is a continuation-in-part of our application Ser. No. 77,426, filed Dec. 21, 1960, now U.S. Patent No. 3,249,589.

This invention is directed to high molecular weight linear polymers, having a regular chemical structure, prepared from ketenes having the general formula $R_2C=C=O$, wherein R is an alkyl group containing from one to six carbon atoms, a cycloalkyl or an alkyl-aryl group. Still more specifically, this invention is directed to a process of preparing polymers from ketenes wherein the polymerizate has a polyketonic structure content in excess of about 85% by weight. Still more specifically, this invention is directed to a method of polymerizing ketenes in the presence of at least one solvent having a high dielectric constant. Of the known solvents having a high dielectric constant the preferred compounds include nitrobenzene, dichloromethane, 1,1,1,2-tetrachloroethane, 1,1-dichloroethylene, etc. The polymers of this invention possess a high crystallinity as determined by X-ray examination which is due to their high regularity of structure.

Heretofore, it was believed that ketenes could not be polymerized to form crystallizable polymers having a regular structure. The reason for this belief, was due to the fact that these monomers to wit: $R_2C=C=O$ have two polymerizable double bonds which may form monomeric units of different chemical structures. These different chemical structures may be characterized by Formulae 1 and 2:

(1) 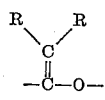

(2) 

Polymers of ketenes having these chemical structures, known heretofore, are the polymerization products of dimethylketene, $(CH_3)_2C=C=O$, as disclosed by Staudinger (Helvetica Chimica Acta 8, 306 (1925)). These products were obtained by operating at temperatures of about $-80°$ C. to $0°$ C. in the presence of trimethylamine as the catalyst. These polymers, however, were amorphous and non-crystallizable even at varied polymerization conditions and contained in the main chain etheric and carbon-to-carbon bonds. These polymerization products may be considered as being copolymers of both of the above-mentioned monomeric units. According to Staudinger, the products obtained corresponded to a cyclic formula containing 3 monomeric dimethylketene units polymerized on the ethylenic bond and 2 units polymerized by the opening of the $>C=O$ bond. All of the polymerization products of Staudinger are thermally unstable and decompose with the formation of volatile products when heated to temperatures between $120°$ C. and $200°$ C.

Thus, it has been found that it is possible to prepare linear high molecular weight polymers of ketenes characterized by the formula $R_2C=C=O$, wherein the crude polymerizate, in the unfractionated state, is crystalline according to X-ray examination. Moreover, it has been found that by physical fractionation processes, such as, for example, by extraction with a suitable solvent, various fractions can be isolated from the crude polymerizate. These fractions are highly crystalline by X-ray examination and consist of high molecular weight linear molecules which necessarily possess a succession of regularly repeated constituted elements. For example, in the crude polymerizate obtained from the polymerization of dimethylketene, it was found possible to isolate a fraction which was not extractable with acetone, but was extractable with benzene. This fraction showed, in general, an intrinsic viscosity (measure in tetrahydronaphthalene at $135°$ C.) ranging between 0.2 and 1.5 and was found to be highly crystalline upon X-ray examination. This crystallinity was also observed in the powdered polymer obtained by extraction and in the product not subjected to thermo or mechanical orientation treatments.

By successive extraction with boiling toluene or chloroform a further small percentage e.g. up to about 10% of the total polymer was dissolved. The fraction not extractable with boiling toluene or chloroform, on the other hand, was found to consist of macromolecules having a crystalline structure which was completely different from that of the other fractions. This fraction had, in general, an intrinsic viscosity, as measured in nitrobenzene at $135°$ C., ranging between 0.5 and 2.0. These two fractions are not different crystalline modifications of the same product, since both fractions had very different infrared absorption spectra when examined in the molten state.

Thus, for instance, in the infrared spectrum of the fractions extractable with boiling toluene, intense absorption bands were clearly observed at about 9 microns, whereas these bands were not present in the infrared spectrum of the fraction which was not extractable with boiling toluene. The fraction not extractable with toluene was also highly crystalline upon X-ray examination. A high crystallinity was observed in this fraction even in the state of a non-oriented powder. The modified polymer, that is the product obtained after melting and cooling the same product, was also highly crystalline, but had a different lattice structure. By extruding the polymer not extractable with boiling toluene and subsequently stretching same, fibers were obtained which were found to be highly oriented as indicated by X-ray examination. The crystalline polydimethylketene which was not extractable with toluene had a melting point of $250-255°$ C. under a polarizing microscope. Furthermore, it was found that by heating this polymer i.e. the one extractable with boiling toluene, to these temperatures no decomposition resulted. This fact further differentiates the polymers from those described in the literature which are known to be thermally unstable even at temperatures below $200°$ C.

The ketene polymers of this invention may be prepared by polymerizing the above-mentioned monomers in the presence of a catalyst having the general formula $AlR'_nX_m$, as more particularly pointed out in applicants' copending application Ser. No. 77,426, filed on Dec. 21, 1960. In addition, complexes of compounds characterized by the formula $AlR'_nX_m$ may be used as the catalyst. The preferred complexes include addition compounds of said formula with organic oxygen-containing bases, such as ethers, their dimers or mixtures thereof. In the general formula of the catalyst, R' represents an alkyl, aryl, cycloalkyl, alkoxy group or a hydrogen atom; X is a halogen such as chlorine, bromine, fluorine or iodine; $m$ is either 0, 1, 2, or 3; and $n$ is $(3-m)$. Of the catalyst coming within this general formula the following examples are illustrations and include such compounds as $AlCl_2(C_2H_5)$; $AlCl(C_2H_5)_2$; $Al(C_6H_5)Cl_2$; $Al(OC_3H_7)Br_2$; $AlBr_3$;

AlCl₃.O(C₂H₅)₂; their dimers, or the sesquihalides such as AlC₂H₅Cl₂.Al(C₂H₅)₂Cl.

The ketene polymers may alternatively be prepared by polymerizing the monomer in the presence of a catalyst consisting essentially of an organic-metallic compound of a metal belonging to the second group of the Mendeléeff Periodic Table. Likewise, addition complexes of these compounds with organic oxygen-containing bases such as ethers, etc. may be used. Examples which illustrate these catalysts include dialkyl beryllium, alkyl beryllium monohalides (or association products of dialkyl beryllium with beryllium dihalides), dialkyl magnesium, alkyl magnesium monohalides, dialkyl zinc and alkyl zinc monohalides.

An important feature of this invention, as distinguished from that disclosed in applicants' copending application, is the fact that in the polymerization of ketenes e.g. dimethylketene, a polymerizate having a polyketonic structure content higher than 85% by weight can be obtained by carrying out the polymerization reaction in the presence of organic solvents which have a high dielectric constant. By using specific organic solvents having a high-dielectric constant, it was found that the polymerizate obtained from the ketene had a polyketonic-structure content in excess of 85% by weight. Thus it is possible to obtain polymers having up to 100% polyketonic structure. The solvents to be used in the polymerization of the ketenes which are known to have a high-dielectric constant include such compounds as nitrobenzene, dichloromethane, 1,1,1,2-tetrachloroethane, and 1,1-dichloroethylene. If desired, either of these solvents may be used alone or in admixture with one another. In addition, these solvents may be used in admixture with other known solvents such as carbontetrachloride, toluene and chloroform. The amount of the high-dielectric solvent to be used in the polymerization may range from 10 to 90% by weight of a mixture of the ketene monomer and the solvent. More preferably the high-dielectric solvent may be used in an amount ranging from about 20–80% by weight of the monomer and solvent. In instances where it may be necessary to use other solvents such as carbontetrachloride, toluene, or chloroform, it may be desirable to use admixtures wherein the high-dielectric solvent ranges from about 25–50% by weight of the mixture of the two solvents. However, various other relative proportions of the two solvents may be used, so long as the high-dielectric constant solvent is present in the polymerization reaction in an effective amount, which may be as low as 10% by weight of the ketene monomer. Accordingly, by using at least one of these high-dielectric constant solvents, it was found possible to obtain ketoketene polymers having a polyketone structure. As disclosed in applicants' copending application, ketene polymers can be prepared which have a structure different from a polyketonic structure. Thus, it was necessary to subject the polymerizate to a purification treatment such as extraction with a solvent e.g. toluene or benzene. The polymerizates, however, of this invention result in polymers having a polyketonic structure when prepared at temperatures ranging from about −100° C. to a +25° C. and more preferably at a temperature of −80° C. to −20° C. in the presence of a cationic catalyst and a solvent having a high-dielectric constant.

It has been noted that by varying the type of aluminum-containing catalyst, the ratio between the amount of polymer extractable with toluene and the amount not extractable with toluene varies in the crude polymerizate. As a general rule, aluminum catalyst having a higher cationic activity favor, with the temperature being the same, the formation of polymers which are not extractable with toluene. When using catalysts of the second group of the Periodic Table particularly the beryllium catalysts, the polymerization of dimethylketene at a temperature between −80° C. and −10° C. results in the production of polymers substantially unextractable with boiling toluene.

The macromolecules of polydimethylketene, for example, which are not extractable with boiling toluene, have substantially the chemical structure of a poly-β-ketone which may be represented by the following formula

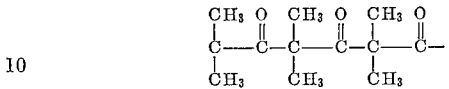

These macromolecules are formed by polymerization of the monomer on the internal double bond >C=C< and by regular head-to-tail enchainment of the monomeric units. The structure of this fraction can be verified by high temperature digestion in an alkaline medium and by reduction of the carbonyl groups to hydroxyl groups in the following manners.

About   gm. of polydimethylketene, not extractable with boiling toluene, were suspended in a mixture of 200 cc. tetrahydrofurane and 20 cc. of absolute ethyl alcohol to which traces of metallic sodium have been added. The suspension obtained was heated in a shaking autoclave for 48 hours at 180° C. and for 48 hours at 260° C. under a nitrogen pressure of about 20 atm. After this treatment, 0.8 gm. of a substantially unaltered polymer, which possesses the same X-ray diffraction spectrum and infrared absorption spectrum as the starting polymer, were recovered by filtration. After separating the solvents, the following products were isolated from the filtrate: approximately 5.1 gm. of a liquid product, boiling at a temperature up to about 130° C. under a pressure of 20 mm. of mercury, and about 1.9 gm. of a liquid boiling at a higher temperature were isolated from the filtrate.

From the analysis carried out by gas phase chromatography, the first fraction was found to consist substantially of a mixture of ethyl isobutyrate and diisopropylketone. In addition to these products, small amounts of substances of a much lower volatility and presumably higher molecular weight were present. The residue, 1.9 gm. of high boiling fraction, after being treated with sodium alcoholate at the boiling point for 90 hours, had a chromatogram wherein the peaks corresponded to the diisopropylketone and ethyl isobutyrate. Thus, it can be concluded that this fraction is an intermediate degradation product of polydimethylketene. The course of this reaction agrees with the known reaction of β-diketones in an alkaline medium. This dimethylketene polymer shows, however, exceptional stability towards alkali materials and will decompose only under very drastic conditions. The structure of this polymer has been confirmed by reducing the carbonyl group with lithium-aluminum hydride (LiAlH₄) in the following manner:

About 4.2 gm. of polymer were suspended in 100 cc. of tetrahydrofurane. About 50 cc. of a saturated lithium-aluminum hydride solution in ether were added. A remarkable evolution of heat was observed and the polymer was dissolved within about half an hour. After about 10 hours at 50° C., the excess lithium-aluminum hydride was destroyed with methanol. After evaporation of the solvents, 3.6 gm. of a white glass-like substance, softening at about 70° C., were isolated by extraction with a solution of theyl ether and methanol. This substance was found to be amorphous by X-ray examination. It was insoluble in ethyl ether, acetone, carbon tetrachloride and ethyl acetate, and soluble in acetic acid, dimethylformamide, chloroform, ethyl alcohol and in aqueous ethyl alcohol solutions.

From the infrared absorption spectrum, it was deduced that only traces of carbonyl groups were present. There was a very intensive absorption at 3.02μ which can be ascribed to the presence of alcoholic hydroxyl groups to the extent of 1 hydroxyl group per monomeric unit.

The solubility in polar solvents and the infrared absorption spectrum showed that the product (obtained by reduction of the polydimethylketene not extractable with toluene), consists essentially of long sequences as follows:

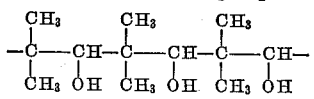

It was further found that the chemical structure of the polymeric fractions soluble in benzene was quite different. The infrared examination of the fractions of the dimethylketene polymers not extractable with ethyl ether, but extractable with benzene, had shown that the macromolecules which formed these fractions possessed a unitary chemical structure, especially when obtained from crude polymers prepared in the presence of triethyl aluminum. In the infrared spectrum of these fractions, the bands at between 5.85 and 6μ (which can be clearly observed in the spectra of the polymer not extractable with toluene), were absent or practically absent. On the contrary, the absorption bands at between 5.71 and 5.76 which are to be ascribed to groupings of the ester type, are clearly observable. A structure for the polymer of this type was in agreement with their transparency and the absence of U.V. absorption peaks at 0.28–0.30μ.

The presence of the polyester type structure was demonstrated by the following hydrogenolysis with a lithium-aluminum hydride:

To 5 gm. of a polydimethylketene fraction (not extractable with ethyl ether but soluble in boiling benzene) dissolved in 80 cc. tetrahydrofurane were added 30 cc. of a saturated lithium-aluminum hydride solution in ether. A rapid reaction took place and the mixture was kept at 25° C. for about 4 hours. The excess lithium-aluminum hydride was destroyed, the solvents were evaporated and, after acidification with a 10% sulphuric acid solution, the product was extracted repeatedly with ether. From the ether extract, 4 gm. of an oily, colorless liquid were isolated by distillation at between 96° C. and 99° C. under a pressure of 20 mm. of mercury.

Examination by chromatography in the vapor phase demonstrates that this fraction consisted of about 95% of a single chemical compound. This compound, from the infrared and U.V. spectra and from a cryoscopic determination of the molecular weight, was found to be 2,2,4-trimethyl-3-keto-pentane-1-ol, which corresponds to the formula:

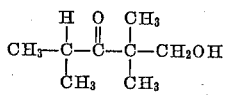

It is known that in a reaction with lithium-aluminum hydride, the formation of a primary alcoholic group can occur only by the reduction of a carboxylic group, while a carbonyl group can be formed by rearrangement of the salt of the enolic form of a ketone.

The formation of a keto-alcohol takes place according to the following scheme and demonstrates that the macromolecules of the polydimethylketene fraction extractable with benzene possess a structure of the polyester type wherein the repeated unit consists of two monomeric units.

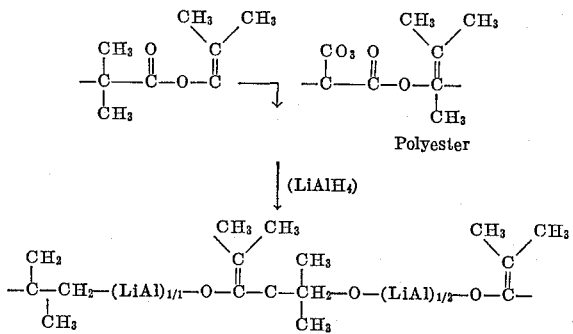

Polyester

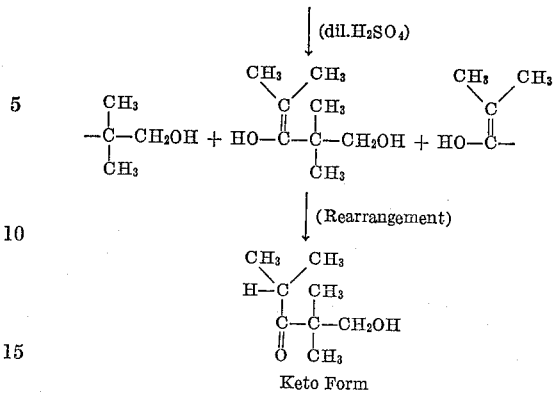

Keto Form

Thus, as distinguished from the teachings in applicants' copending application, it was found that by utilizing solvents having a high dielectric constant it was possible to obtain a polymerizate at least 85% by weight of a polyketonic structure. Of the many ketenes, others in addition to dimethyl-ketene, may be used. These include, for example, the higher homologues such as the diethyl-, diisopropyl-, dibutylketene and the dicyclo-alkyl and substituted or unsubstituted diphenyl ketenes such as dicyclohexyl-, diphenyl- or ditolylketene.

The following examples are given as illustrations of this invention.

*Example 1*

About 110 cc. of dimethylketene, 200 cc. of carbon tetrachloride and 200 cc. of nitrobenzene were introduced under an inert gas into a flask provided with an agitator and an inlet tube, and immersed in a bath at −40° C. As soon as the mixture reached the temperature of the bath, 20 cc. of an 0.8 molar solution of aluminum tribromide in nitrobenzene were introduced. Agitation was continued for 6 hours and the reaction was stopped by adding methanol and hydrochloric acid. The polymer was filtered and washed first with methanol and hydrochloric acid and then with methanol and finally vacuum dried.

About 41.5 g. of product were obtained. The residue, after being extracted with boiling toluene, amounted to 93% of the starting polymer. It had an intrinsic viscosity of 3.2 (100 cc./g. in nitrobenzene at 135° C.) and appeared crystalline by X-ray examination.

*Example 2*

About 100 cc. of dimethylketene, 300 cc. of toluene and 100 cc. of nitrobenzene were introduced under an inert atmosphere into a flask provided with an agitator and a nitrogen inlet tube and immersed in a bath at −40° C. The mixture was agitated and when it reached the temperature of the bath, 20 cc. of an 0.8 molar solution of aluminum tribromide in nitrobenzene were added. After 3 hours, the polymerization was stopped by additions of methanol and hydrochloric acid. The polymer was washed first with methanol and hydrochloric acid and then with methanol and finally vacuum dried.

About 30 g. of product were obtained. The fraction insoluble in boiling toluene amounted to 88% of the polymerizate. It had an intrinsic viscosity of 1.76 (100 cc./g. in nitrobenzene at 135° C.) and appeared crystalline by X-ray examination.

*Example 3*

About 100 cc. of dimethylketene, 200 cc. of toluene, 200 cc. of nitrobenzene and 1 cc. of aluminum dichloromonoethyl were introduced into the apparatus of Examples 1 and 2 with the same modalities.

After 5 hours about 4 g. of polymer are obtained. The fraction insoluble in boiling toluene amounted to 93% and had an intrinsic viscosity of 0.97 (100 cc./g. in nitrobenzene at 135° C.) and appeared crystalline by X-ray examination.

Due to the linear structure the relatively low melting point and the presence of polar groups in the polymeric chain, the crystalline polymers of this invention, particularly the polymers of dimethylketene, are suitable for the preparation of textile fibers and the like. These fibers are more easily dyed than those obtained from other hydrocarbon polymers. The dimethylketene polymer which is insoluble in boiling toluene is of particular interest because of its high melting point e.g. 240–250° C. and its high crystallinity. These polymers may be used as thermoplastic polymers, since they can be compression molded, extruded or injection molded with machinery normally used for working thermoplastic resins. The high crystallization rate of the polymers and the high crystallinity makes it possible to obtain finished products without requiring annealing operation, thus avoiding the deformation which normally occurs after molding. The main chain of the polymer, in spite of the presence of quaternary carbon atoms, has good flexibility which favors orientation by a mechanical operation such as rolling, stretching, etc. By stretching the extruded filament, for example, it is possible to obtain well-oriented, highly-crystalline fibers having a high tensile strength.

While this invention has been described with respect to a number of specific embodiments, it is obvious that there are many other modifications and variations which can be made without departing from the spirit of the invention, except as more particularly pointed out in the appended claims.

What is claimed is:

1. A process for preparing linear, normally solid, crystallizable ketoketene polymers having at least 85% by weight of a polyketonic structure of the formula

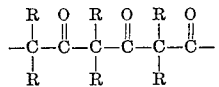

in which R is an alkyl radical containing from 1 to 6 carbon atoms, which process comprises polymerizing a ketene of the formula

in which R is an alkyl radical containing from 1 to 6 carbon atoms, in an inert atmosphere, at a temperature of from $-100°$ C. to $+25°$ C., in a solvent medium comprising at least one solvent having a high dielectric constant selected from the group consisting of nitrobenzene, dichloromethane, 1,1,1,2-tetrachloroethane, and 1,1-dichloroethylene in an amount from 10 to 90% by weight of the mixture of ketene and solvent medium, and in contact with a catalyst having the formula $AlR'_nX_m$, in which R' is selected from the group consisting of hydrogen, alkyl, aryl, cycloalkyl and alkoxy groups, X is halogen, $m$ is selected from the group consisting of 1, 2 and 3 and $n$ is $3-m$.

2. The process of claim 1 further chracterized in that the high-dielectric solvent contains in admixture therewith a solvent selected from the group consisting of carbon tetrachloride, toluene, and chloroform.

3. The process of claim 1 further characterized in that the solvent is nitrobenzene.

4. The process of claim 1 further characterized in that the solvent is dichloromethane.

5. The process of claim 1 further characterized in that the solvent is 1,1,1,2-tetrachloroethane.

6. The process of claim 1 further characterized in that the solvent is 1,1-dichloroethylene.

7. The process of claim 1 further characterized in that the ketene is dimethylketene.

8. The process of claim 2 further characterized in that the solvent in admixture with the high-dielectric solvent is toluene.

9. The process of claim 2 further characterized in that the solvent in admixture with the high-dielectric solvent is carbon tetrachloride.

10. The process of claim 1 further characterized in that the catalyst is aluminum tribromide.

11. The process of claim 1 further characterized in that the catalyst is aluminum dichloromonoethyl.

12. The process of claim 1 further characterized in that the high-dielectric solvent is nitrobenzene and the catalyst is aluminum tribromide.

13. The process of claim 12 further characterized in that the ketene is dimethylketene.

14. The process of claim 1 further characterized in that the polymerization of the ketene takes place at a temperature ranging from about a $-80°$ C. to a $-20°$ C.

15. The process according to claim 1, characterized in that the amount of the solvent medium used is from 20% to 80% by weight of the mixture of ketene and solvent medium.

16. The process according to claim 2, further characterized in that the amount of the high dielectric solvent is from 25 to 50% by weight of the mixture thereof with the solvent selected from the group consisting of carbon tetrachloride, toluene and chloroform.

No references cited.

WILLIAM H. SHORT, *Primary Examiner.*

C. A. WENDEL, L. LEE, *Assistant Examiner.*

UNITED STATES PATENT OFFICE
CERTIFICATE OF CORRECTION

Patent No. 3,350,357                          October 31, 1967

Giulio Natta et al.

It is hereby certified that error appears in the above numbered patent requiring correction and that the said Letters Patent should read as corrected below.

Column 4, line 63, for "theyl" read -- ethyl --; column 5, lines 60 to 65, the right-hand formula should appear as shown below instead of as in the patent:

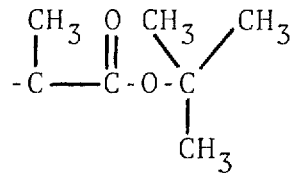

same column 5, lines 70 to 75, the formula should appear as shown below instead of as in the patent:

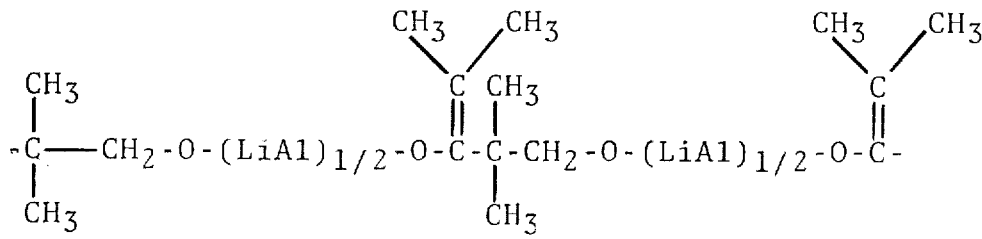

Signed and sealed this 11th day of February 1969.

(SEAL)
Attest:

EDWARD M. FLETCHER, JR.                  EDWARD J. BRENNER
Attesting Officer                            Commissioner of Patents